(12) United States Patent
Veligdan

(10) Patent No.: US 6,571,044 B2
(45) Date of Patent: May 27, 2003

(54) HIGH CONTRAST DISPLAY PANEL AND A METHOD OF MAKING A HIGH CONTRAST DISPLAY PANEL

(75) Inventor: James T. Veligdan, Manorville, NY (US)

(73) Assignee: Scram Technologies, Inc., Dunkirk, MD (US)

(*) Notice: Subject to any disclaimer, the term of this patent is extended or adjusted under 35 U.S.C. 154(b) by 0 days.

(21) Appl. No.: 09/861,459

(22) Filed: May 18, 2001

(65) Prior Publication Data

US 2002/0172480 A1 Nov. 21, 2002

(51) Int. Cl.⁷ .............................................. G02B 6/04
(52) U.S. Cl. ....................................... 385/120; 385/901
(58) Field of Search .................................. 385/120, 901

(56) References Cited

U.S. PATENT DOCUMENTS

| | | |
|---|---|---|
| 3,253,500 A | 5/1966 | Hicks, Jr. |
| 3,874,783 A | 4/1975 | Cole |
| 4,116,739 A | 9/1978 | Glenn |
| 4,344,668 A | 8/1982 | Gunther et al. |
| 4,418,986 A | 12/1983 | Yata et al. |
| 4,469,402 A | 9/1984 | Yata et al. |
| 4,586,781 A | 5/1986 | Gunther et al. |
| 4,674,836 A | 6/1987 | Yata et al. |
| 5,066,947 A | 11/1991 | Du Castel |
| 5,274,406 A | 12/1993 | Tejima et al. |
| 5,381,502 A | 1/1995 | Veligdan |
| 5,422,691 A | 6/1995 | Ninomiya et al. |
| 5,455,882 A | 10/1995 | Veligdan |
| 5,481,385 A | 1/1996 | Zimmerman et al. |
| 5,521,725 A | 5/1996 | Beeson et al. |
| 5,625,736 A | 4/1997 | Veligdan |
| 5,642,449 A | 6/1997 | Phillips |
| 5,668,907 A | 9/1997 | Veligdan |
| 5,684,905 A | 11/1997 | Sugawara et al. |
| 5,716,118 A | 2/1998 | Sato et al. |
| 5,764,845 A | 6/1998 | Nagatani et al. |
| 5,914,760 A | 6/1999 | Daiku |
| 5,940,555 A | 8/1999 | Sugawara |
| 6,002,826 A | 12/1999 | Veligdan |
| 6,012,816 A | 1/2000 | Beiser |
| 6,031,954 A | 2/2000 | Higuchi |
| 6,038,360 A * | 3/2000 | Sugawara .................... 385/116 |
| 6,222,971 B1 * | 4/2001 | Veligdan et al. ............. 385/120 |
| 6,259,855 B1 * | 7/2001 | Lundin ....................... 385/146 |
| 6,301,417 B1 | 10/2001 | Biscardi et al. ............. 385/120 |
| 6,317,545 B1 * | 11/2001 | Veligdan ..................... 359/443 |
| 6,487,350 B1 * | 11/2002 | Veligdan et al. ............ 385/120 |

OTHER PUBLICATIONS

Veligdan, "Unique Interactive Projection Display Screen", Sep. 29, 1997, 7 pages.

(List continued on next page.)

*Primary Examiner*—Lynn D. Feild
*Assistant Examiner*—Hae Moon Hyeon
(74) *Attorney, Agent, or Firm*—Reed Smith LLP; William J. McNichol, Jr.; Matthew J. Esserman

(57) ABSTRACT

An optical display panel which provides improved viewing contrast is disclosed. The optical panel includes a plurality of stacked optical waveguides, wherein each waveguide has an inlet face and an outlet face at opposing ends of each waveguide, and wherein each waveguide is formed of a core in contact with at least one cladding layer, wherein the at least one cladding layer includes at least one black layer, and at least one redirector connected to the inlet face of each of at least two waveguides. The at least one black layer has a first thickness, and the core has a second thickness, and the first thickness is preferably a multiple of the second thickness. In a preferred embodiment, the first thickness is at least two times greater than the second thickness. In a second preferred embodiment, the first thickness is at least four times greater than the second thickness.

23 Claims, 6 Drawing Sheets

OTHER PUBLICATIONS

Beiser, et al., "Ten Inch Planar Optic Display", Proceedings of the International Society for Optical Engineering (SPIE), vol. 2734, Apr. 1996, 9 pages.

Yoder, "The State-of-the-Art in Projection Display: An Introduction of the Digital Light Processing DLP", Texas Instruments Web Site, Mar. 1997, 5 pages.

DeSanto, et al., "Polyplanar Optical Display Electronics", Proceedings of the International Society (SPIE), vol. 3057, Apr. 1997, 12 pages.

* cited by examiner

HIGH CONTRAST DISPLAY PANEL AND A METHOD OF MAKING A HIGH CONTRAST DISPLAY PANEL

CROSS REFERENCE TO RELATED APPLICATIONS

Not applicable.

BACKGROUND OF THE INVENTION

1. Field of the Invention

The present invention is directed generally to a planar optical display, and, more particularly, to a high contrast display panel and a method of making a high contrast display panel.

2. Description of the Background

Video display screens typically use cathode ray tubes (CRTs) for projecting an image onto the outlet face of the screen. A typical screen of this type has a width to height ratio of 4:3 with 525 vertical lines of resolution. An electron beam must be scanned both horizontally and vertically on the screen to form a number of pixels, which collectively form the image. Conventional cathode ray tubes have a practical limit in size and are relatively deep to accommodate the required electron gun. Larger screen televisions are available which typically include various forms of image projection for increasing the screen image size. However, such screens may experience limited viewing angle, limited resolution, decreased brightness, and decreased contrast, particularly in projection display screens.

It is known that optical panels can be created using a plurality of stacked waveguides, and an optical panel may be rendered black using at least one black cladding layer between transparent cores of the waveguides. The cladding layers have a lower index of refraction than the waveguide cores for effectuating total internal reflection of the image light channeled through the cores, and thereby improve contrast, i.e. thereby improve the appearance of black images on a screen.

In the typical television application using optical panels, the black areas are minimized in order to maximize the light transmission area, and to thereby improve screen brightness. However, the minimization of the black areas on the face of the optical panel does not allow for optimization of screen contrast, due to the fact that only increases in the black area allow for increases in screen contrast. Further, maximization of the light transmission area simultaneously increases the area that reflects ambient light, thereby further decreasing screen contrast and darkness.

Therefore, the need exists for a display panel that increases the appearance of the black area on the screen to thereby improve viewing contrast.

BRIEF SUMMARY OF THE INVENTION

The present invention is directed to a high contrast optical panel. The optical panel includes a plurality of stacked optical waveguides, wherein each waveguide has an inlet face and an outlet face at opposing ends of each waveguide, and wherein each waveguide is formed of a core in contact with at least one cladding layer, wherein the at least one cladding layer includes at least one black layer, and at least one redirector connected to the inlet face of each of at least two waveguides. The at least one black layer has a first thickness, and the core has a second thickness, and the first thickness is preferably greater than the second thickness. In a preferred embodiment, the first thickness is at least two times greater than the second thickness. In a second preferred embodiment, the first thickness is at least four times greater than the second thickness.

The high contrast optical display panel solves problems experienced in the prior art by providing a display panel that increases the appearance of the black area on the screen to thereby improve viewing contrast. Further, the present invention reduces ambient light reflections from the light redirector.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
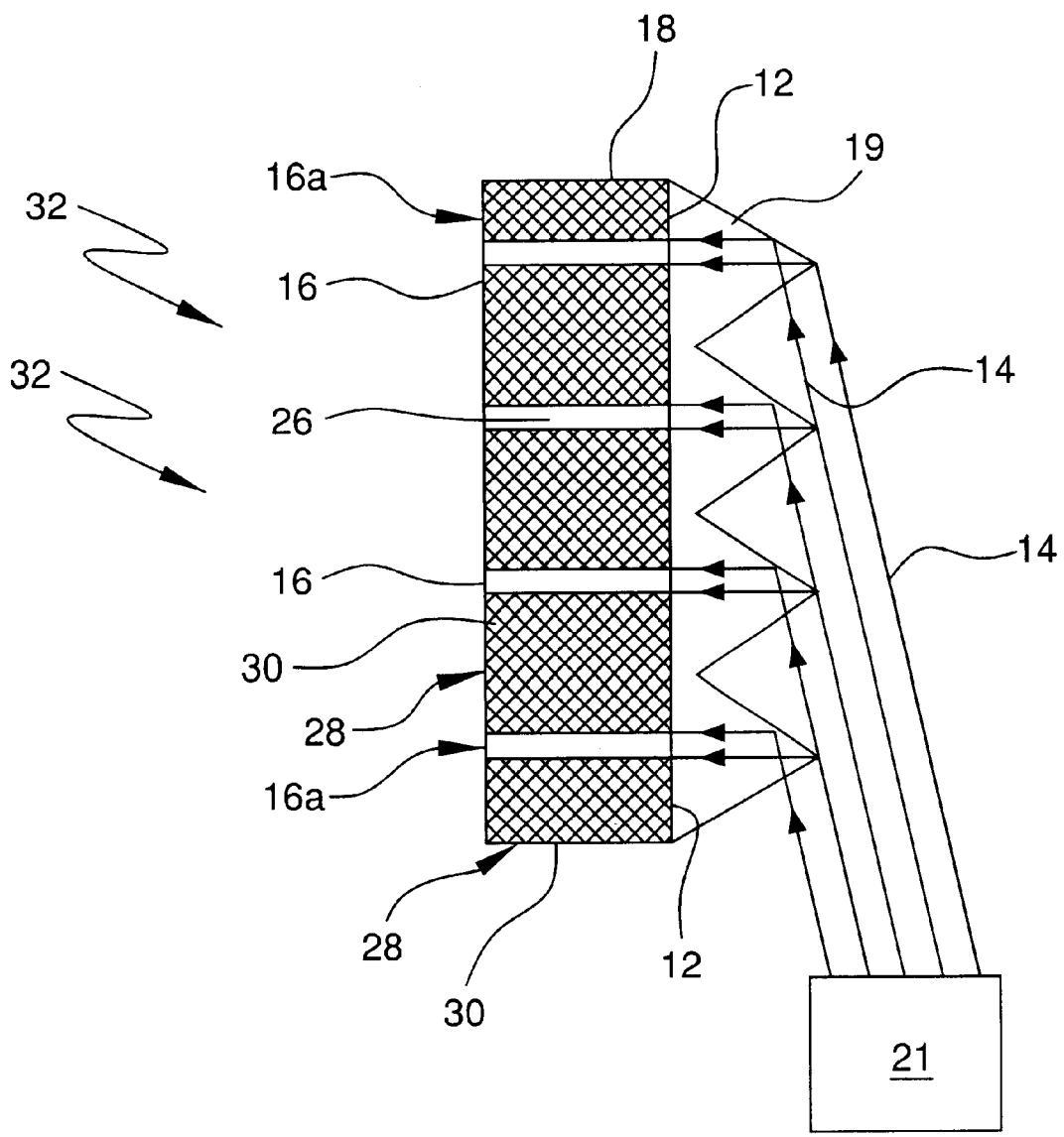
FIG. 1 is a cross-sectional view illustrating a cross section of a high contrast display panel.
Figure 6:
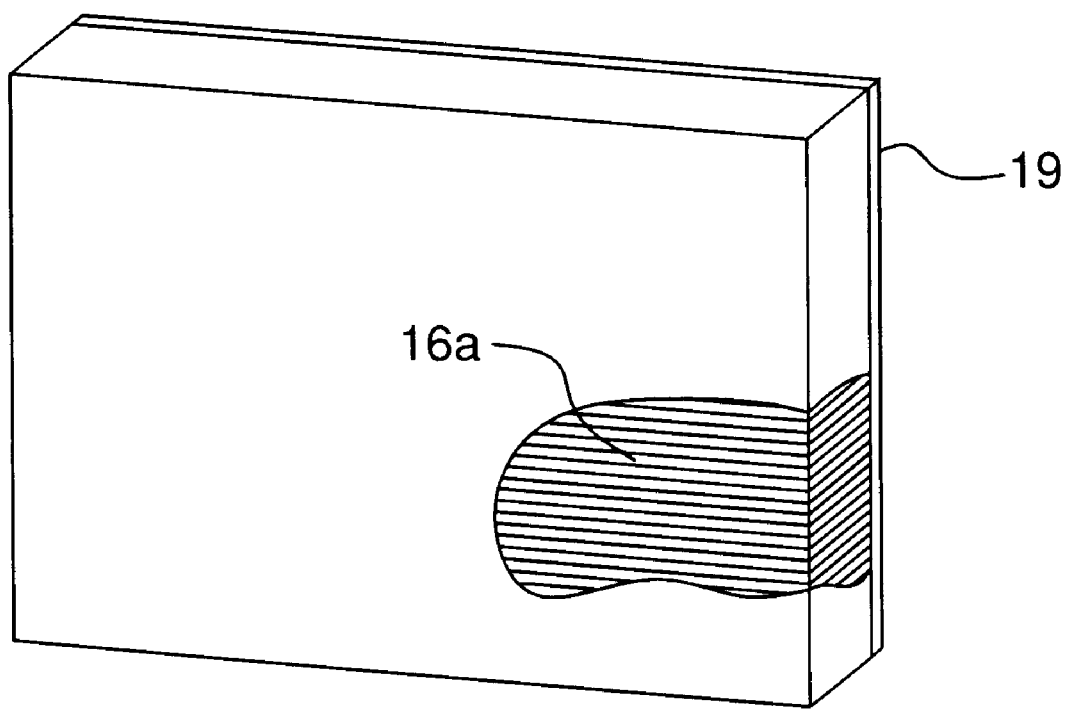
FIG. 6 is an isometric view, in partially broken away form, illustrating a high contrast display panel.

FIG. 1 is a cross-sectional view schematic illustrating a display panel 10. The display panel 10 includes a plurality of stacked optical waveguides 16a, wherein each waveguide 16a layer has a black layer, such as a black cladding layer, therebetween, an outlet face 16 at one end of a body 18 formed by the plurality of stacked waveguides 16a, an inlet face 12 at a second end of the body 18, wherein the inlet face 12 preferably includes a redirector 19, such as a TRAP manufacturers by 3M® Corporation of Minneapolis Minn., or similar structure, thereon, and a light generator 21. FIG. 6 is an isometric view, in partially broken away form, illustrating a display panel 10 having waveguides 16a and a redirector 19 in accordance with the present invention.

The body 18 is preferably solid and receives light 14 along the surface of the inlet face 12. In a preferred embodiment, the inlet face includes thereon a redirector 19, such as a TRAF, a TRAF-like, or a similar structure, that redirects light incoming to the inlet face 12 into the waveguides 16a. The light 14 is passed through the body 18 after entering the inlet face 12, and is substantially totally internally reflected through the body 18 to the outlet face 16. In a preferred embodiment of the present invention, the body 18 is formed of the length, height, and width of the plurality of stacked waveguides 16a.

The plurality of stacked waveguides 16a forms the body 18 of the panel 10, forms at one end of the stack 16a the inlet face 12, and at a second end the outlet face 16. The waveguides 16a may be formed of any material known in the art to be suitable for passing electromagnetic waves therethrough, such as, but not limited to, plastics, or glass. The preferred embodiment of the present invention is implemented using individual glass, plastic or polymer sheets, which are typically approximately 0.001–0.020" thick, and which may be of a manageable length and width. Of course, other thicknesses may be employed for each individual glass, plastic or polymer sheet, dependant upon the overall dimensions of the display. The polymer used may be a suitable plastic laminate, such as Lexan®, which is commercially available from the General Electric Company or any polymers or acrylics, such as Plexiglass.

The waveguides 16a are in the form of sheets or ribbons extending the full width of the outlet face 16 and are stacked to collectively form at their upper ends the height of the outlet face 16. The waveguides 16a are disposed along their longitudinal light transmitting axes. The number of waveguides 16a may be selected for providing a corresponding vertical resolution of the outlet face 16. For example, 525 of the waveguides 16a may be stacked to produce 525 lines of vertical resolution in the outlet face 16. Several waveguides may optionally be employed for each line of vertical resolution. An embodiment wherein multiple waveguides are employed decreases the criticality of alignment tolerances of the screen to the incoming image light. Since the waveguides 16a extend the full width of the outlet face 16, horizontal resolution may be controlled by horizontal modulation of the image light 14.

Figure 4:
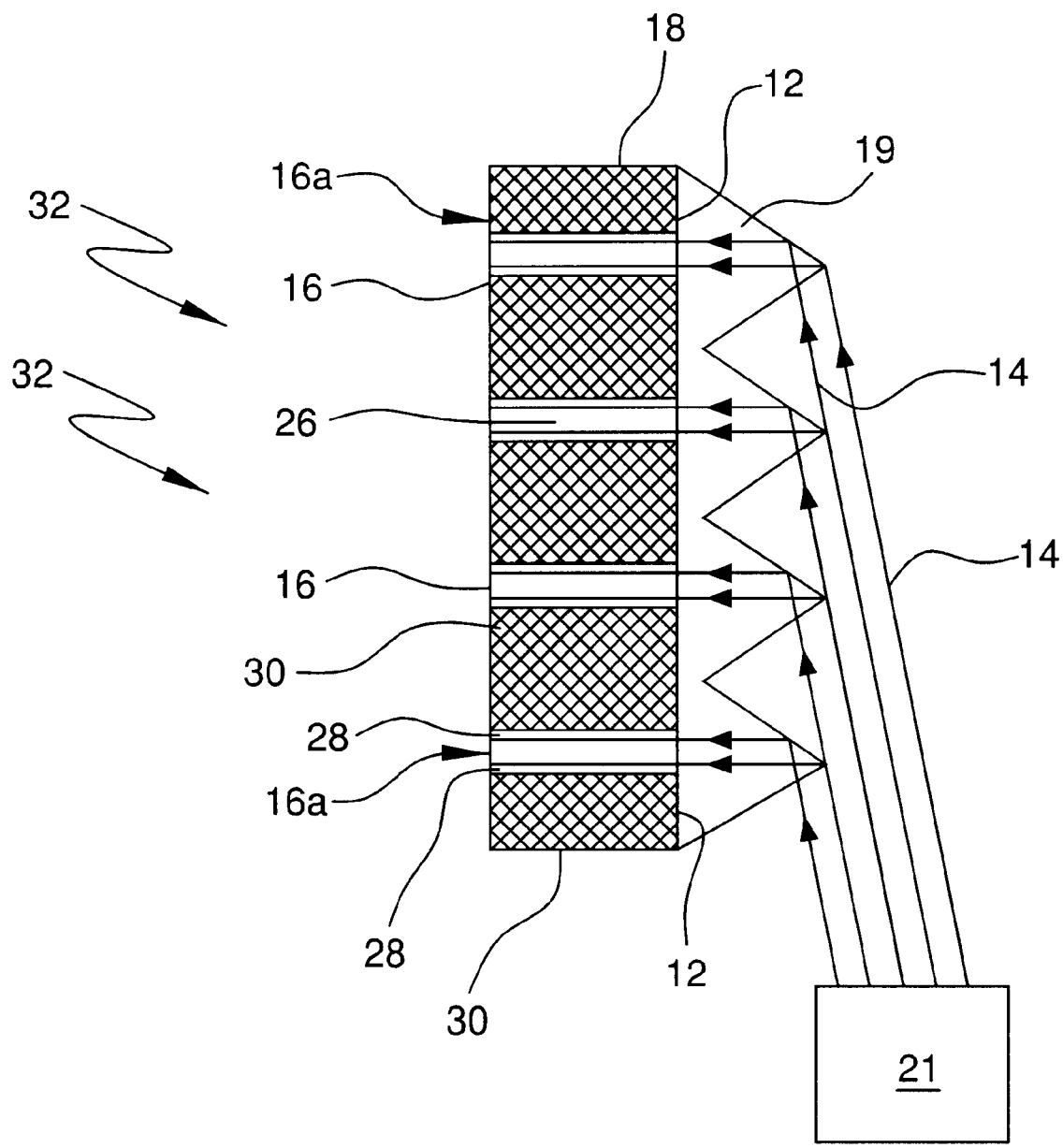
FIG. 4 is a cross-sectional view illustrating a third alternative embodiment of the high contrast display panel.
Figure 5:
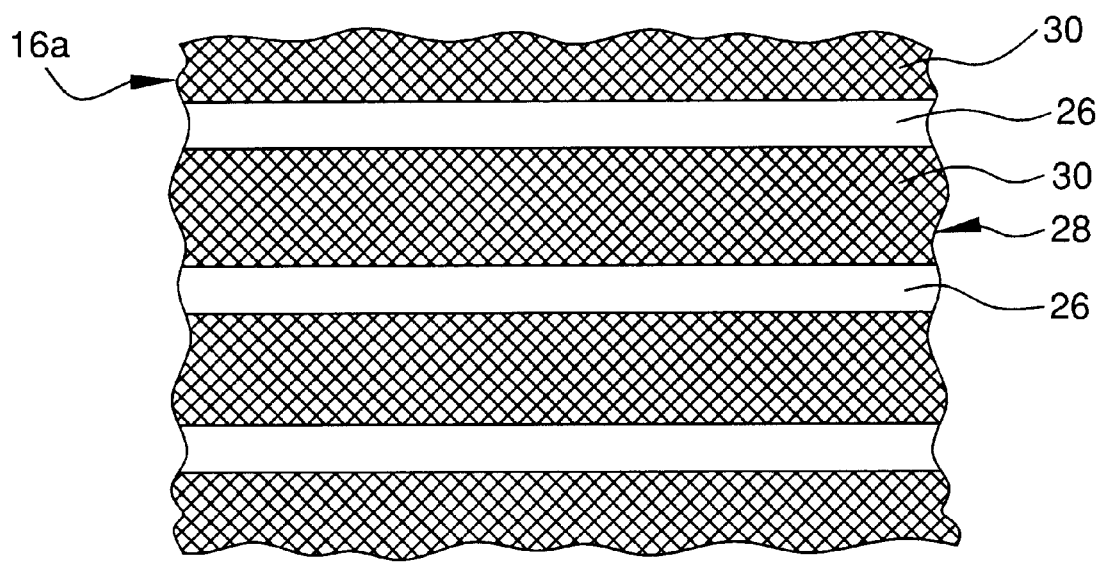
FIG. 5 is a partial view illustrating the front viewing surface of a high contrast display panel.

Each of the plurality of waveguides includes a central core 26 for channeling the image light 14 through the waveguides, and each core 26 is disposed between cladding layers 28. In a profaned embodiment of the present invention, the cladding layers 28 extend completely from the inlet face 12 to the outlet face 16 along the entire width of the outlet face 16. A black layer 30 may be disposed within or between adjoining cladding layers 28 for absorbing ambient light 32 at the outlet face 16, and may form multi-layer cladding layers 28. FIG. 4 illustrates, in cross-section view, a display panel 10 having a black layer 30 disposed between adjoining cladding layers 28. FIG. 5 illustrates, in partial view, a front viewing surface of a display panel having black layers 30 provided as the cladding layers 28. The term black is used herein to encompass not only pure black color, but additionally, any functionally comparable dark color suitable for use in the present invention, such as dark blue. The black layer 30 is only necessary within the viewable region of the outlet face, but, in a preferred embodiment of the present invention, the black layer 30 extends completely from the inlet face 12 to the outlet face 16 along the entire width of the outlet face 16. Additionally, the cladding layers 28 may be formed of dark gradient refractive index layers.

In a preferred embodiment of the present invention, the outlet face 16 comprises at least ½ black layer by surface area. In a more preferred embodiment of the present invention, the outlet face 16 comprises at least ⅘ black layer by surface area. In other words, the black layers, which may be or may be between the cladding layers, comprise at least 80% of each waveguide/cladding/black layer layer. For example, the clear waveguide core would be ¼ of the thickness of the black layer at the outlet face 16. Thus, the thickness of the black layer is a multiple of at least, for example, 1, greater than or equal to the thickness of the clear layer, i.e. of the core. In a preferred embodiment, the black layer extends to the inlet face 12, but does not extend to the edge of the redirector 19. Alternatively, the black layer may extend to the edges of the redirector 19, and thus be adjacent to the path of the input light from the light generator 21.

Further, the use of the redirector 19, such as a TRAF or TRAF-like prismatic structure, in conjunction with the devotion of just approximately 20% of the thickness of each layer to the central core decreases the ambient reflection area of the redirector 19. The useful area available to ambient light is thereby limited to just 20% of the redirector 19. Reflected ambient light is thus further reduced at the inlet face, thereby further improving screen darkness and contrast at the outlet face 16.

Each central core 26 has a first index of refraction. The cladding layers 28, which, as discussed hereinabove, may be black, have a second index of refraction, lower than that of the central core 26, for ensuring total internal reflection of the image light 14 as it travels from the inlet face 12 to the outlet face 16. The black layers 30, if separate from the cladding layers, may have any index of refraction, but are still preferably equal to, or substantially greater than, the thickness of the central cores 26.

The inlet face 12 and outlet face 16 are formed by the plurality of waveguides 16a, wherein one end of each waveguide 16a forms an inlet for that waveguide, and wherein the opposite end of each waveguide 16a forms an outlet for that waveguide 16a. Each waveguide 16a extends horizontally, and the plurality of stacked waveguides 16a extends vertically. The light 14 may be displayed on the outlet face in a form such as, but not limited to, a video image. Consequently, in a preferred embodiment the plurality of waveguides 16a are stacked approximately parallel to the horizontal, thus placing the outlet face 16 and the inlet face 12 in the same plane from the horizontal and approximately equidistant from the horizontal.

Figure 2:
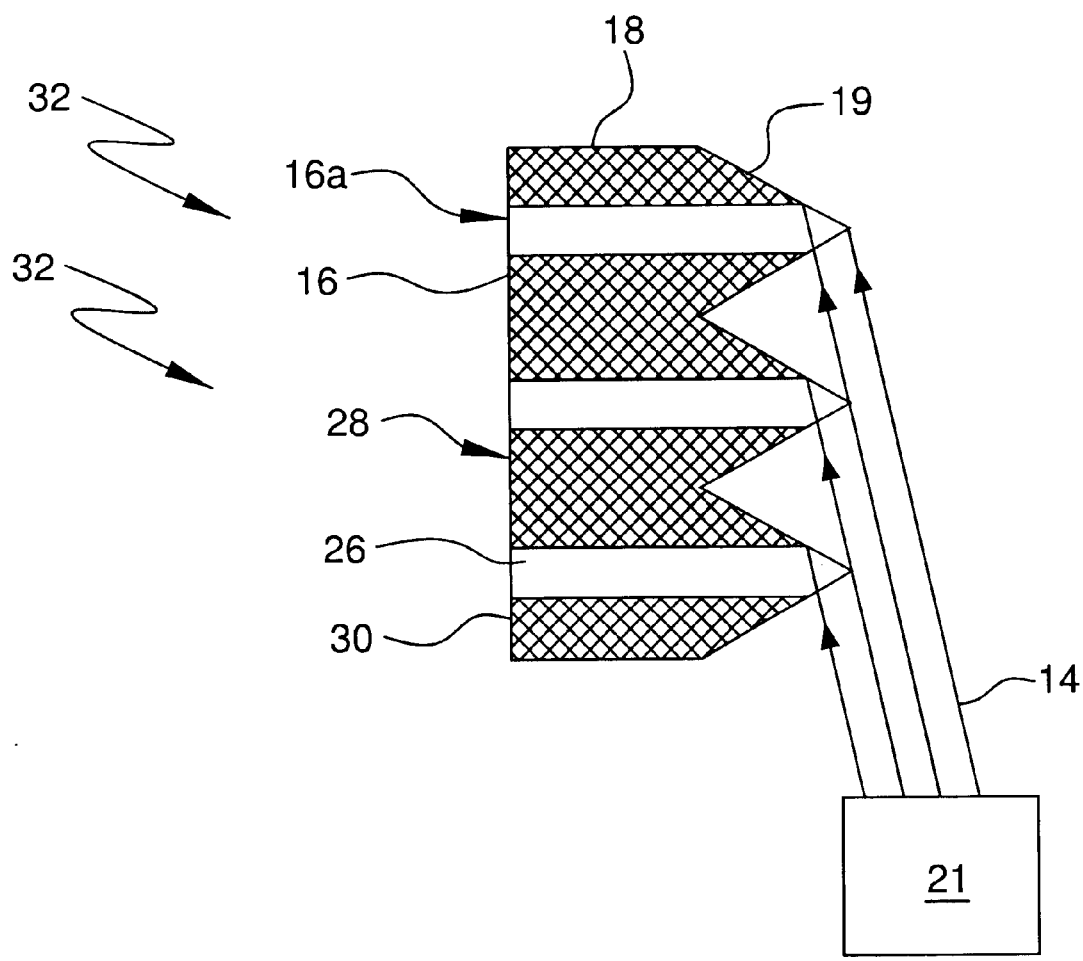
FIG. 2 is a cross-sectional view illustrating an alternative embodiment of the high contrast display panel.
Figure 3:
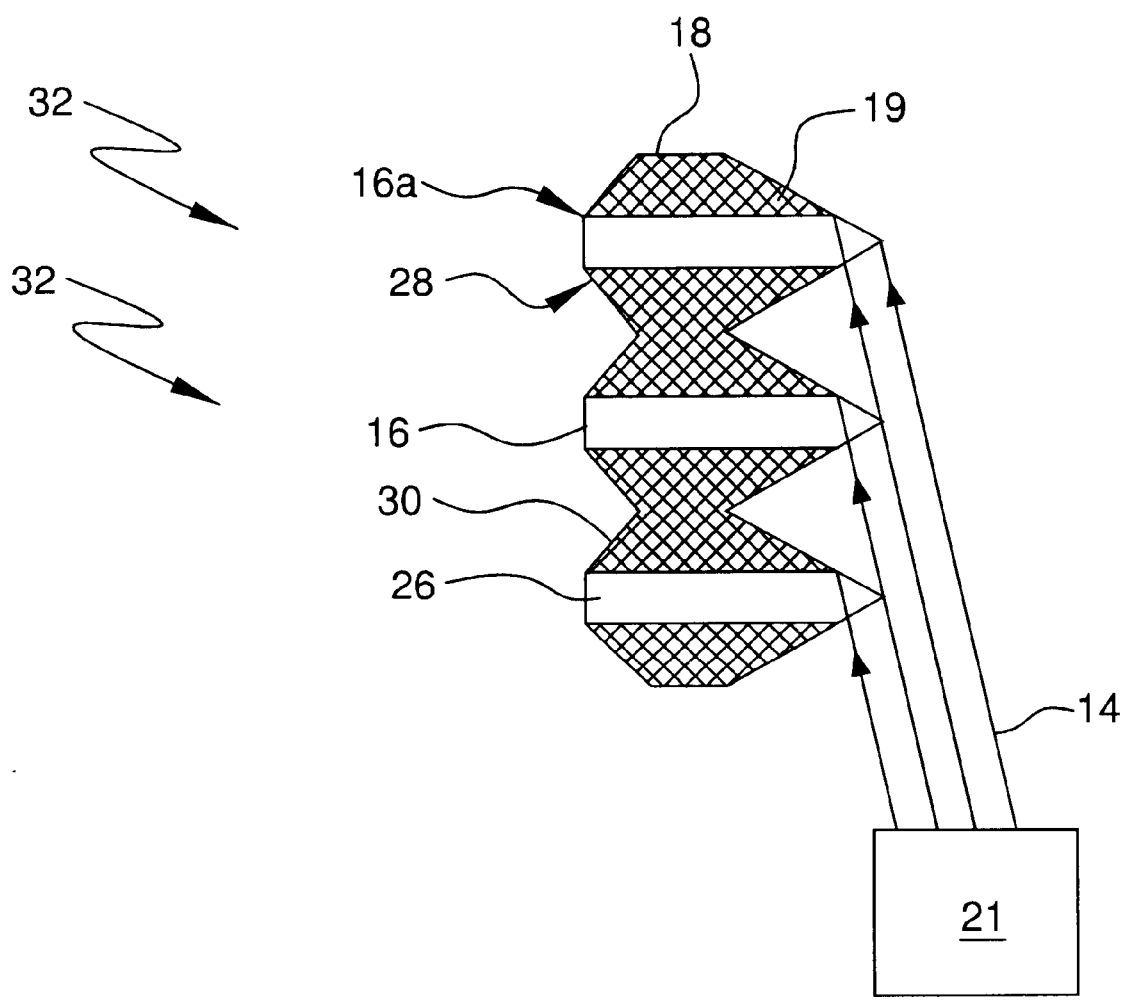
FIG. 3 is a cross-sectional view illustrating a second alternative embodiment of the high contrast display panel.

The inlet face 12 is formed by the plurality of stacked optical waveguides 16a. The inlet face 12 is at one end of the body 18, and receives light 14 from the light generator 21. The inlet face may be flat or serrated, and the black layers may extend to the outlet face, but not to the redirector 19, as shown in FIG 1, or may extend through the redirector 19, as shown in FIG. 2. In the preferred embodiment, the inlet face 12 includes thereon the at least one redirector 19 fastened thereto, such as by adhesive, epoxy or embossing. The outlet face 16 is defined as the front of the body 18, and the outlet face may be flat, as shown in FIGS. 1 and 2, or serrated, such as with only a flat area proximate to and including the exit point of the central core, as shown in FIG. 3. The outlet face 16 may additionally include, such as by embossing, or have thereon, such as by affixing, a diffuser, for example, to present an improved image to the viewer. Additionally, the panel 10 has a height from the top to the bottom of the outlet face 16, and a width from the left to the right of the outlet face 16. The width and height may be selected to produce width to height aspect ratios of 4:3 or 16:9, for example, for use in a typical television application.

The light generator 21 generates light 14 and passes the light to inlet face 12. The light 14 preferably strikes the redirector 19 at a steep entrance angle. The light generator 21 may be a white light projector, such as an overhead projector, or may include a light source, and/or a light modulator, and/or imaging optics, such as a video or movie projector. The light 14 may be initially generated, for example, by the light source. The light source may be, for example, a bright incandescent bulb, a laser, an arc lamp, an LED, an RF excited gas discharge lamp, any solid state light source, or any phosphorescent, luminescent, or incandescent light source. The light 14 from the source may then be modulated by the modulator for defining individual picture elements, known in the art as pixels. Alternatively, the light may define a simple lighted item, such as an on/off switch. The imaging optics may include light folding mirrors or lenses. The imaging optics may be optically aligned between the outlet face 16 and the light modulator for compressing or expanding and focusing the light 14 as required to accurately provide the image to the outlet face 16. The light 14, after entry into the inlet face 12 from the redirector 19, travels through the panel body 18 to the outlet face 16.

In a preferred embodiment, clear strips of plastic, which are preferably approximately ½" by 40", and approximately 20/1000" thick, are stacked, with a double sided black adhesive strip between each plastic strip, or with a dark gradient between each strip. The dark, or black, layers are preferably at least approximately 4 times the thickness of the plastic strips at each layering. The strip stack is then pressed under high pressure to remove air bubbles and increase adhesion. The adhesive may be shades other than black, such as dark blue, and preferably rolls out like a form of tape, in a plastic/adhesive/plastic/adhesive format. The pressure applied to the completed stack is preferably in excess of 1,000 pounds.

Those of ordinary skill in the art will recognize that many modifications and variations of the present invention may be implemented. The foregoing description and the following claims are intended to cover all such modifications and variations.

What is claimed is:

1. An optical panel comprising:
a plurality of stacked optical waveguides, wherein each waveguide has an inlet face and an outlet face at opposing ends of each waveguide, wherein each waveguide is formed of a core in contact with at least one cladding layer, and wherein the at least one cladding layer includes at least one black layer;
wherein the plurality of outlet faces form an optical panel outlet face, and wherein the optical panel outlet face comprises at least ½ black layer by surface area.

2. The optical panel of claim 1, further comprising at least one redirector provided at the inlet face of at least one waveguide.

3. The optical panel of claim 2, wherein said at least one redirector redirects incoming light to the core of at least one of the plurality of inlet faces.

4. The optical panel of claim 3, wherein said redirector comprises a prismatic structure.

5. The optical panel of claim 4, wherein said prismatic structure comprises a transmissive light redirecting element.

6. The optical panel of claim 1, wherein said cores comprise at least one polymer.

7. The optical panel of claim 1, wherein said cores comprise plastic.

8. The optical panel of claim 1, wherein said cores comprise glass.

9. The optical panel of claim 1, wherein said cores are each in the range of about 0.001 inches to about 0.020 inches in thickness.

10. The optical panel of claim 1, wherein the plurality of outlet faces form an optical panel outlet face, wherein the optical panel outlet face comprises at least ⅘ black layer by surface area.

11. The optical panel of claim 1, wherein the black layer of each waveguide extends to the inlet face.

12. The optical panel of claim 2, wherein the black layer of each waveguide extends through said redirector.

13. The optical panel of claim 2, further comprising a light generator which generates light incident on said redirector.

14. The optical panel of claim 13, wherein said light generator includes
a light source.

15. The optical panel of claim 14, wherein said light generator further includes
a light modulator; and
imaging optics.

16. The optical panel of claim 15, wherein the light from said light source is modulated by said light modulator to define pixels.

17. The optical panel of claim 1, wherein the waveguides are in the form of ribbons.

18. An optical panel comprising:
a plurality of stacked optical waveguides, wherein each waveguide has an inlet face and an outlet face at opposing ends of each waveguide, wherein each waveguide is formed of a core in contact with at least one cladding layer, and wherein the at least one cladding layer includes at least one black layer;
wherein the at least one black layer has a first thickness, and wherein the core has a second thickness, and wherein the first thickness is at least two times greater than the second thickness.

19. The optical panel of claim 18, wherein the first thickness is at least four times greater than the second thickness.

20. The optical panel of claim 18, wherein the waveguides are in the form of ribbons.

21. An optical panel comprising:
a plurality of stacked optical waveguides, wherein each waveguide has an inlet face and an outlet face at opposing ends of each waveguide, wherein each waveguide is formed of a core in contact with at least one cladding layer, and wherein a black layer is provided between adjoining cladding layers;
wherein the plurality of outlet faces form an optical panel outlet face, and wherein the optical panel outlet face comprises at least ½ black layer by surface area.

22. The optical panel of claim 21, further comprising at least one redirector provided at the inlet face of at least one waveguide.

23. The optical panel of claim 21, wherein the waveguides are in the form of ribbons.

* * * * *